United States Patent [19]

Terlep

[11] Patent Number: 5,594,433
[45] Date of Patent: Jan. 14, 1997

[54] OMNI-DIRECTIONAL LED LAMPS

[76] Inventor: Stephen K. Terlep, 8000 Sugar Pine Dr., West Melbourne, Fla. 32904

[21] Appl. No.: 513,098

[22] Filed: Aug. 9, 1995

[51] Int. Cl.$^6$ .................................................. B60Q 7/00
[52] U.S. Cl. ..................... 340/908.1; 340/907; 340/908; 340/473; 362/800
[58] Field of Search ........................ 340/908.1, 981, 340/982, 983, 907, 908, 321, 332, 473; 362/180, 182, 186, 800

[56] References Cited

U.S. PATENT DOCUMENTS

| | | | |
|---|---|---|---|
| 1,198,734 | 9/1916 | Ludescher | 340/473 |
| 2,644,152 | 6/1953 | Ginsberg | 340/366 |
| 2,719,506 | 10/1955 | Sequeira | 116/63 |
| 3,204,093 | 8/1965 | Heenan | 340/908.1 |
| 3,587,185 | 6/1971 | Deal | 40/132 |
| 3,739,169 | 6/1973 | Weinreich | 240/22 |
| 3,981,263 | 9/1976 | Capucio | 116/63 |
| 4,467,193 | 8/1984 | Carroll | 250/216 |
| 4,841,344 | 6/1989 | Heinen | 357/17 |
| 5,068,771 | 11/1991 | Savage, Jr. | 362/255 |
| 5,103,383 | 4/1992 | Mayhew | 362/186 |
| 5,122,781 | 6/1992 | Saubolle | 340/473 |
| 5,130,909 | 7/1992 | Gross | 362/153 |
| 5,140,220 | 8/1992 | Hasegawa | 313/512 |
| 5,147,129 | 9/1992 | Ku | 362/102 |
| 5,175,528 | 12/1992 | Choi et al. | 340/331 |
| 5,211,699 | 5/1993 | Tipton | 362/101 |
| 5,294,924 | 3/1994 | Dydzyk | 340/473 |
| 5,313,187 | 5/1994 | Choi et al. | 340/331 |
| 5,469,157 | 11/1995 | Carpenter et al. | 340/908.1 |

FOREIGN PATENT DOCUMENTS 1256639  12/1971  United Kingdom .

*Primary Examiner*—Thomas Mullen
*Assistant Examiner*—Van T. Trieu
*Attorney, Agent, or Firm*—Brian S. Steinberger; Law Offices of Brian S. Steinberger

[57] ABSTRACT

Omni-directional LED lamps are disclosed in three embodiments. In a first embodiment, two LEDs are mounted side by side in a miniature bayonet base that can fit into a conventional miniature bayonet socket. The side-by-side LEDs face semi-spherical mirror reflectors that distribute the unidirectional light emitted from the LEDs over an omni-direction. A second embodiment has two LEDs facing one another with a spherical mirror reflector between to cause unidirectional light to be omnidirectional. In a third embodiment, a semi-spherical reflector is mounted in the top of a lens cover above an LED. The components are housed in a sealable casing for marine applications where the casing can be mounted to a dock piling.

14 Claims, 7 Drawing Sheets

OMNI-DIRECTIONAL LED LAMPS

This invention relates to LEDs, and in particular to embodiments for allowing an LED to emit an omni-directional light for traffic control and warning lamps used on land and water.

BACKGROUND AND PRIOR ART

Traffic control lamps and warning lamps need to emit light in an omni-direction in order to properly signal those approaching the lamps from all directions. Traffic control and warning lamps are generally used on land at road construction and building construction sights. Similar lamps are useful in water applications to signal and warn approaching watercraft of docks, jetties, and obstacles. These lamps emit either a continuous light or a blinking light.

Incandescent light bulbs which comprise filaments are well known to be useful for emitting omni-directional light, wherein light is emitted in 360 degrees about the bulb. See for example, United Kingdom patent specification 1,256,639 to Botting; U.S. Pat. Nos. 2,644,152 to Ginsberg; 2,719,506 to Sequeira. However, everyday environmental conditions can cause the heated filaments in these light sources to fail such as variations in temperature and voltage. Further, incandescent light sources are particularly susceptible to failure from shock or vibration. Thus, any single one or any combination of these environmental conditions can destroy the filament and render the lamp useless. Lamps using the incandescent light bulbs often require constant replacement of the batteries used to power the lamps due to the power requirements of the bulbs.

LED(light emitting diodes) can emit a longer lasting and cheaper light source than an incandescent bulb. However, basic LEDs are not omni-directional. An LED emits up to a 90 degree cone of light. Various techniques such as combining plural LEDs together and using additional diffusion methods on the LEDs themselves have been attempted in order to increase the viewing angle of the LED. See for example, U.S. Pat. Nos. 5,122,781 to Saubolle and 5,140,220 to Hasegawa. However, these techniques add additional manufacturing costs in assembly and materials. Furthermore, these techniques due not create a fully emitting omni-directional light.

Thus, the need exists for an effective omni-directional light source for traffic control and warning lamps that avoids the problems of the prior art previously discussed.

SUMMARY OF THE INVENTION

The first objective of the present invention is to provide a high intensity LED omnidirectional light source for traffic control and warning lamps on land and in the air.

The second object of this invention is to provide a high intensity LED omnidirectional light source for traffic control and warning lamps over water.

The third object of this invention is to provide an omni-directional LED traffic control and warning lamp that is less susceptible to shock and vibration than an incandescent light bulb lamp.

The fourth object of this invention is to provide an omni-directional LED traffic control and warning lamp that has a significantly greater life expectancy than an incandescent light bulb lamp.

The fifth object of this invention is to provide an omni-directional LED traffic control and warning lamp that uses significantly less electrical power than an incandescent light bulb lamp.

The sixth object of this invention is to provide an omni-directional LED lamp that does not use diffusion lens over the LEDs.

The seventh object of this invention is to provide an omni-directional LED lamp for use with a traffic control lamp and warning lamp of the type A, flashing variety.

The eighth object of this invention is to provide an omni-directional LED lamp for use with a traffic control lamp and warning lamp of the type C, continuous burn variety.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1B:
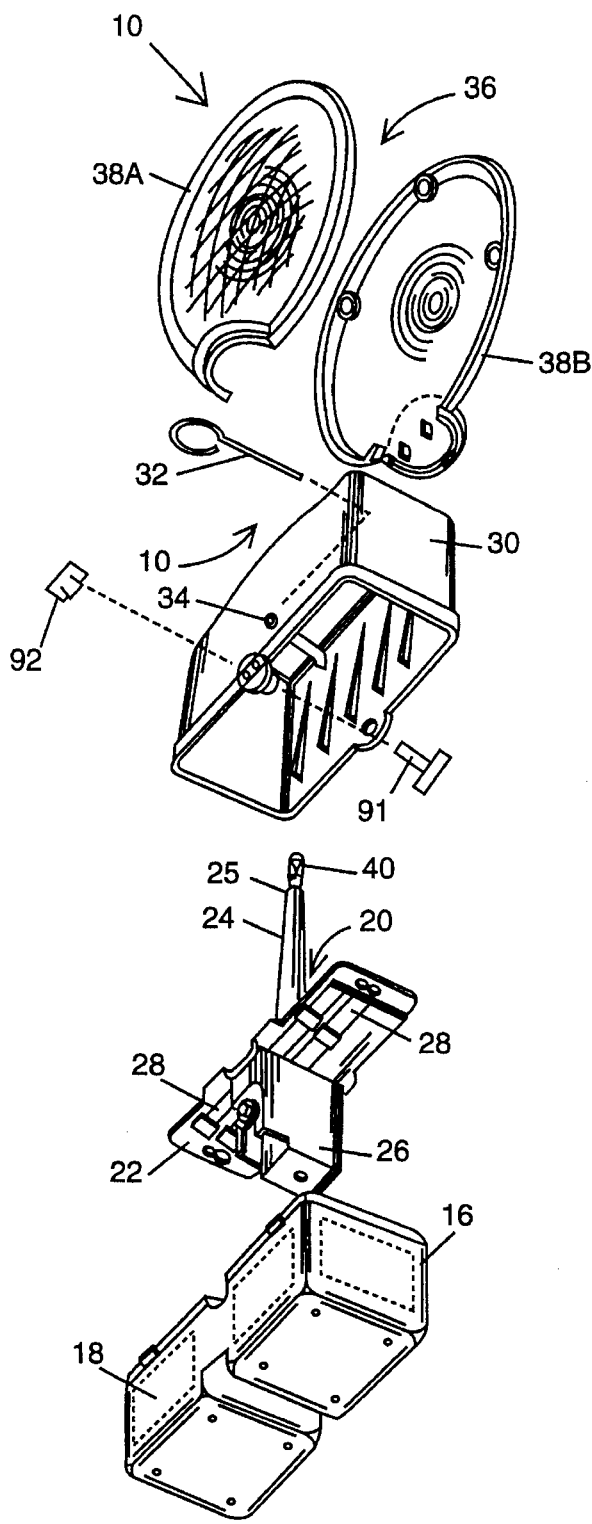
FIG. 1B is an exploded view of the prior art traffic control and warning lamp of FIG. 1A.
Figure 1A:
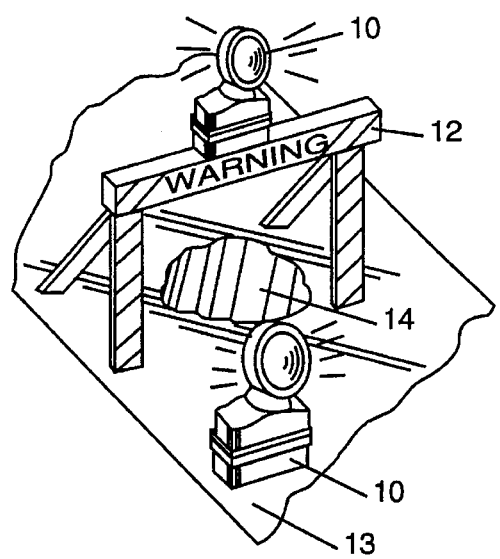
FIG. 1A illustrates a typical prior art traffic control and warning lamp used to signal road hazards.

FIG. 1A illustrates a typical prior art traffic control and warning lamp 10 used to signal road hazards. The traffic control and warning lamp 10 can be positioned on a typical road barrier 12 and/or directly on the ground 13 adjacent a road hazard 14, such as but not limited to a manhole, a pothole and the like.

FIG. 1B is an exploded view of the prior art traffic control and warning lamp 10 of FIG. 1A which is provided with a bottom case 16 in which two batteries 18 can be housed on opposite sides of the case 16. Referring to FIG. 1B, circuit assembly 20 is comprised of a platform 22. Integrally connected to the bottom of platform 22 is electronic housing 26 which houses conventional electrical components(not shown) for determining whether lamp 10 is a type A(flashing) or type C(continuous burn) device. Connected to the bottom of the platform 22 of circuit assembly 20 are electrical contacts 28. Electrical contacts 28 make contact with batteries 18. The batteries 18 provide electrical power to the incandescent light bulb 40 which is inserted into the socket 25 that is provided at the top of the shaft 24. Electrical conduits(not shown) which connect to the electrical contacts 28 are provided in the shaft 24 and electronic housing 26 and interfere with socket 25.

Referring to FIG. 1B, the circuit assembly 20 rests upon batteries 18 provided in the bottom case 16. A top case 30 is placed over the circuit assembly 20 such that the top of the shaft 24 is inserted through a hole(not shown) at the top of the top case 30. The top case 30 is provided with a switch access hole 34 for purposes of turning the light bulb 40 on or off by means of switch pin 32. A lens 36 connects around the hole(not shown) at the top of the top case 30 with the lens 36 being comprised of a front lens 38A and a rear lens 38B. When the traffic control lamp 10 is assembled the light bulb 40 is positioned between the front lens 38A and the rear lens 38B at the center of the respective lenses.

Figure 1C:
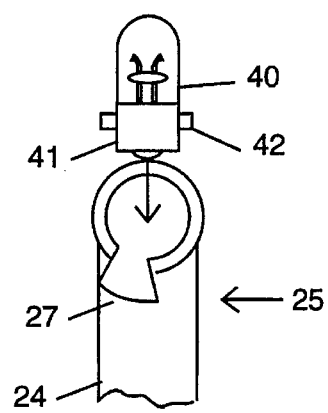
FIG. 1C is an enlarged view of the incandescent bulb and socket of FIG. 1B.

Referring to FIG. 1B, the traffic control lamp 10 is further provided with conventional screws/bolts 91 and nuts 92 to secure the lamp 10 together. FIG. 1C is an enlarged view of the conventional incandescent bulb 40 having a bayonet base 41 with prongs 42 that fits within a conventional socket 27. Socket 27 can be a typical miniature bayonet socket such as that found in the Flex-O-Light™ Model 301 traffic control lamp 10. Bayonet base 42 is manufactured to be accommodated by the miniature bayonet socket 25.

FIRST PREFERRED EMBODIMENT

Figure 2A:
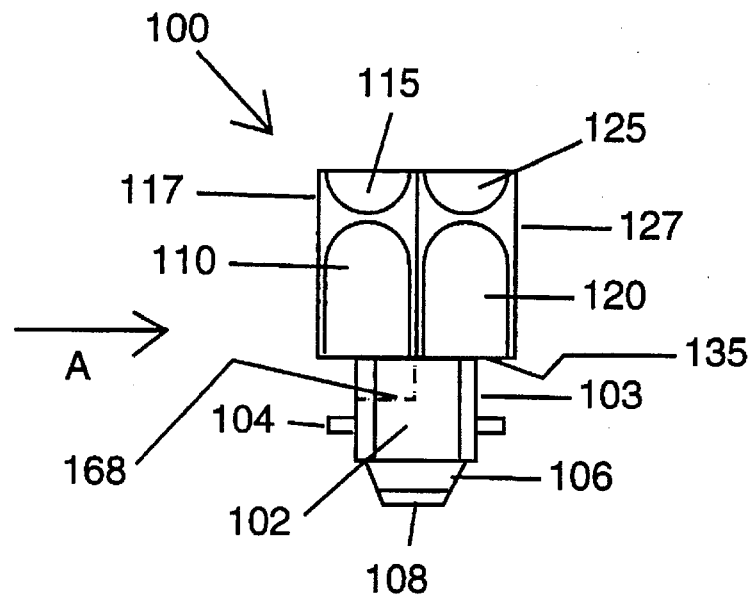
FIG. 2A is a perspective view of a first embodiment of the novel omni-directional lamp invention.
Figure 2B:
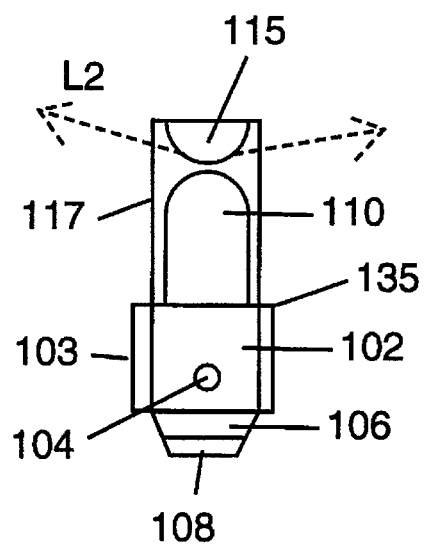
FIG. 2B is a perspective view of the first embodiment of FIG. 2A along arrow A.

FIG. 2A is a perspective view of a first embodiment 100 of the novel omni-directional lamp invention that includes two high intensity LEDs 110 and 120 which can be connected in series in the manner shown in reference to FIG. 2C which will be described later. FIG. 2B is a perspective view of the first embodiment 100 of FIG. 2A along arrow A. Referring to FIGS. 2A and 2B, LEDs' 110 and 120 are preferably of a high intensity type such as the high powered AlInGaP amber lamps manufactured by Hewlett Packard (T-1¾ 30° HLM"T"-DLOO). The amber-colored light emitted by the Hewlett Packard T-1¾ 30° HLM"T"-DLOO LED has a wavelength of approximately 592 nm which is ideal for the desired visibility in a traffic control lamp. LED 110 and 120 should meet or exceed the visibility standards established by the Federal Highway Administration which requires that type "A" and type "C" traffic control lamps be visible on a clear night from a distance of 3000 feet.

Referring to FIGS. 2A and 2B, LEDs' 110 and 120 can be surrounded by tubular canopies 117 and 127 that can be made of a clear and pliable plastic material. Tubular canopies 117 and 127 can protect the LEDs 110 and 120 and connects to the top of a bayonet base through a insulative platform 135 made of plastic, elastomer and the like. The bayonet base 102 has prongs 104 similar in shape to the bayonet base 41 and prongs 42 of FIG. 1C. The prongs 42 engage the bayonet socket 25 of FIG. 1C.

Referring to FIGS. 2A–2B, semi-spheric(half a sphere) reflectors 115 and 125 can be mounted in the top of tubular canopies 117 and 127 by glue, molded as one piece, and the like. Reflectors 115, 125 can be formed by various means such as depositing a mirror finish onto a plastic semi-spheric shape. Alternatively, reflectors 115 and 125 can be formed from half of stainless steel ball bearings, and the like, where the surfaces of the semi-spheres are mirror reflective to fight.

Figure 2C:
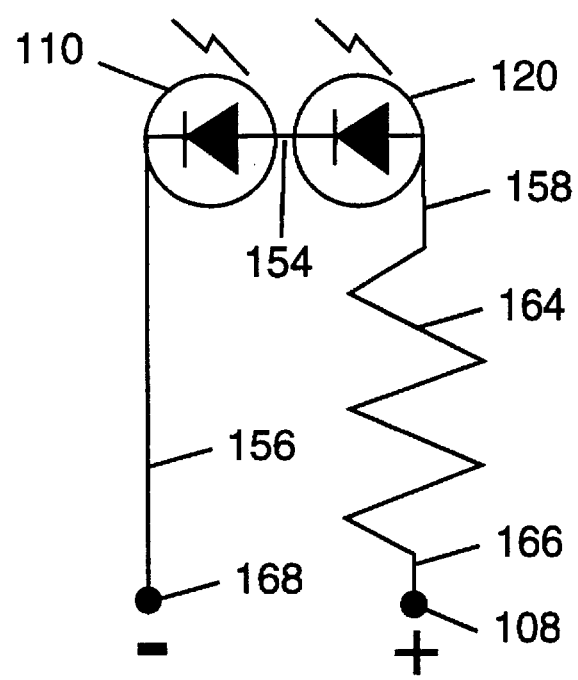
FIG. 2C illustrates a schematic circuit depicting the two LEDs of the first embodiment in series.

FIG. 2C illustrates a schematic circuit depicting the two LEDs 110, 120 of the first embodiment 100 in series by electrical connector 154. LED 110 connects to the negative battery terminal 168 through electrical connector means 156. Electrical connector 158 connects LED 120 to a ballast resistor 164 and electrical connector means 166 connects the ballast resistor 164 to the positive battery terminal 108 of a battery(such as the battery 16, 18 of FIG. 1B. Referring to FIGS. 2A–2C, electrical contact 108 is provided at the bottom of the bayonet base 102 and separated from the barrel wall 103 of bayonet base 102 by insulator 106. Barrel wall 103 can serve as a conduit to the negative battery terminal 168 and electrical contact 108 serves as a conduit to positive battery terminal 108(as shown in FIG. 2C).

The operation of embodiment 100 will now be discussed in reference to FIG. 2B. LED 110 emits a cone shaped fight pattern that is reflected by reflector 115 so that the fight is emitted 360° out along the direction of arrows L1 and L2.

SECOND PREFERRED EMBODIMENT

Figure 3A:
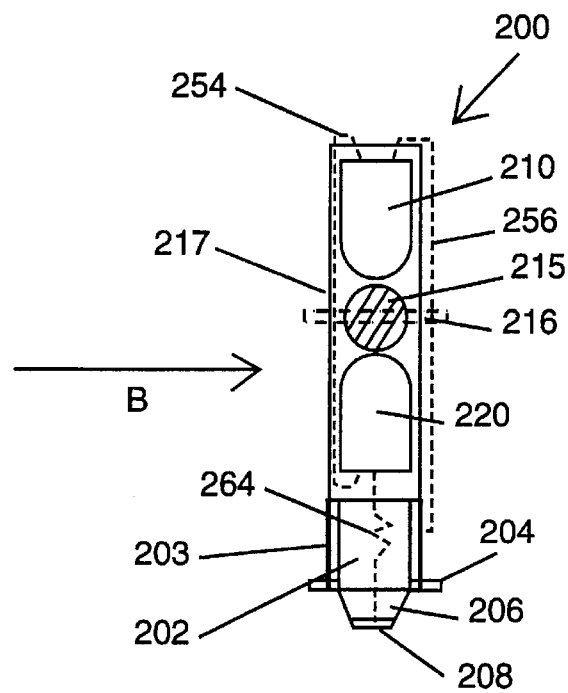
FIG. 3A is a perspective view of a second embodiment of the omni-directional lamp invention.
Figure 3B:
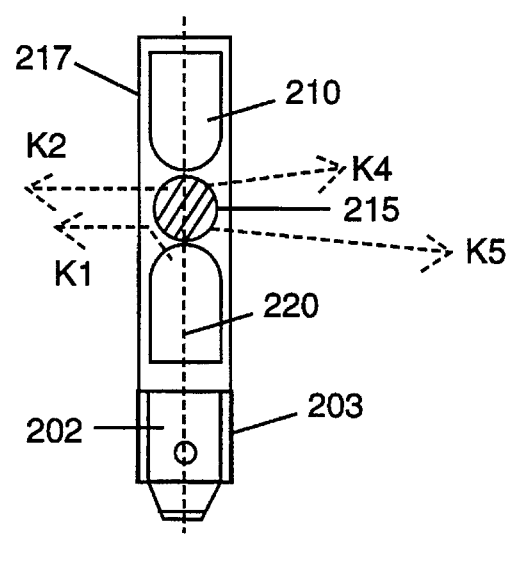
FIG. 3B is a perspective view of the second embodiment of FIG. 3A along arrow B.

FIG. 3A is a perspective view of a second embodiment 200 of the novel omni-directional lamp invention. FIG. 3B is a perspective view of the second embodiment 200 of FIG. 3A along arrow B. Referring to FIGS. 3A–3B, embodiment 200 includes two LEDs 210, 220 facing one another wired in series 254, 256 along with bayonet base components 206, 208 in a manner similar to the embodiment 100 of FIGS. 2A–2C. Resistor 264 of FIG. 3A corresponds to similar resistor 164 of FIG. 2C. Bayonet base components 203, 204, 206, 208 and prongs 204 operate similar to like components 103, 104, 106, 108 of FIGS. 2A–2C.

LEDs 210 and 220 used in embodiment 200 of FIGS. 3A–3B are similar to LEDs 110 and 120 of FIGS. 2A–2C.

Referring to FIGS. 3A–3B, LEDs' 210 and 220 can be surrounded by tubular canopy 217 that can be made of a clear and pliable plastic material. Tubular canopy 217 protects the LEDs 210 and 220 and can be supported within the canopy 217 by electrical wire type conductors 254, 258.

Referring to FIGS. 3A–3B, a spherical reflector 215 can be mounted in the middle of tubular canopy 217 by glue, molded as one piece, and the like. Optionally, an axle member 216, such as but not limited to molded plastic, metal insert, and the like, can be mounted through both sides of canopy 217 to suspend spherical reflector 215. Similar to the reflectors of the previous embodiment 100, Reflector 215 can be formed by various means such as depositing a mirror finish onto a plastic spherical shape. Alternatively, reflector 215 can be formed from stainless steel ball bearings, and the like, where the surfaces of the ball beatings are mirror reflective to light.

The operation of embodiment 200 will now be discussed in reference to FIG. 3B. LEDs 210 and 220 each emits a cone shaped light pattern that is reflected by spherical reflector 215 so that the light is emitted 360° out along the direction of arrows K1, K2, K3 and K4.

OMNI-DIRECTIONAL REFLECTOR COVER EMBODIMENT

Figure 4A:
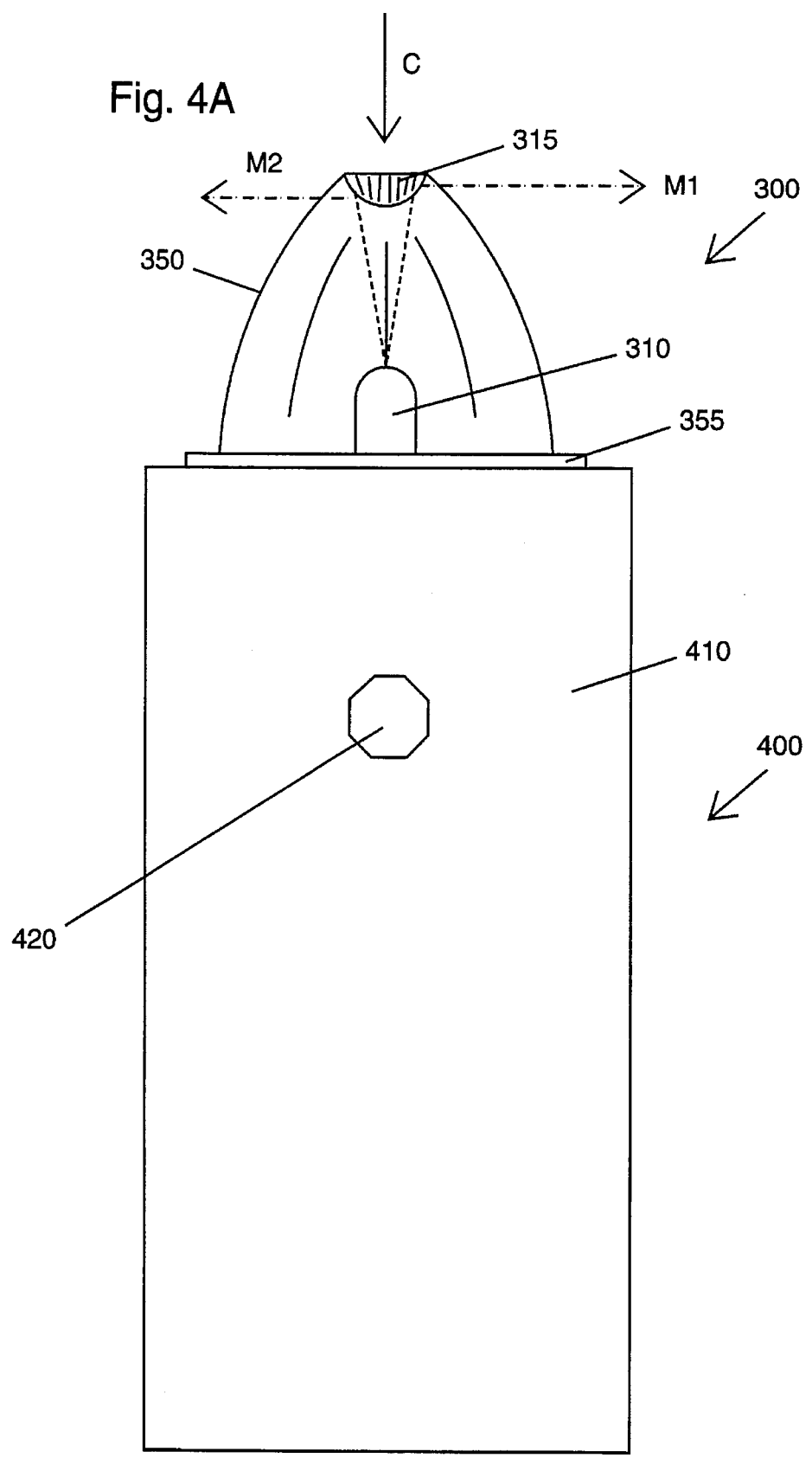
FIG. 4A is a front view of a novel omni-directional LED lamp device invention.
Figure 4B:
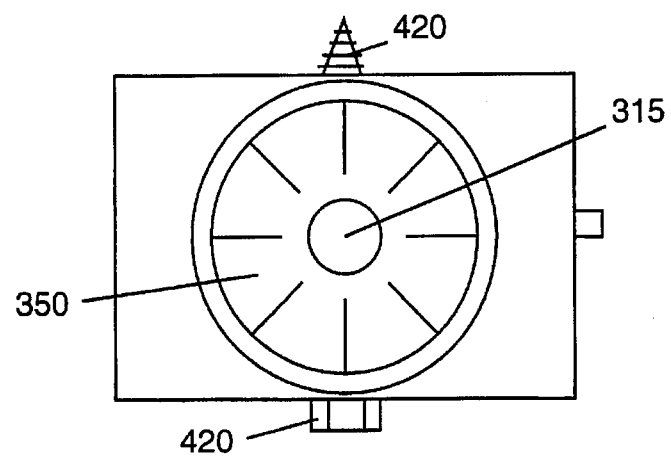
FIG. 4B is a top view of the omni-directional LED lamp device of FIG. 4A along arrow C.

FIG. 4A is a front view of a novel omni-directional LED lamp device invention 300. FIG. 4B is a top view of the omni-directional LED lamp device of FIG. 4A along arrow C. Referring to FIGS. 4A–4B, embodiment 300 includes a colored lens cover 350 shaped like a dome with base 355 that can be made and molded from clear colored plastic such as but not limited to orange, yellow and the like. Inside lens cover 350 is mounted a semi-spherical reflector 315 located above an LED 310 similar to those described previously.

Also, similar to the embodiments described previously, reflector 315 of FIGS. 4A–4C can be formed by various means such as depositing a mirror finish onto a plastic semi-spheric shape. Alternatively, reflector 315 can be formed from half of stainless steel ball bearings, and the like, where the surfaces of the semi-spheres are mirror reflective to light.

Figure 4C:
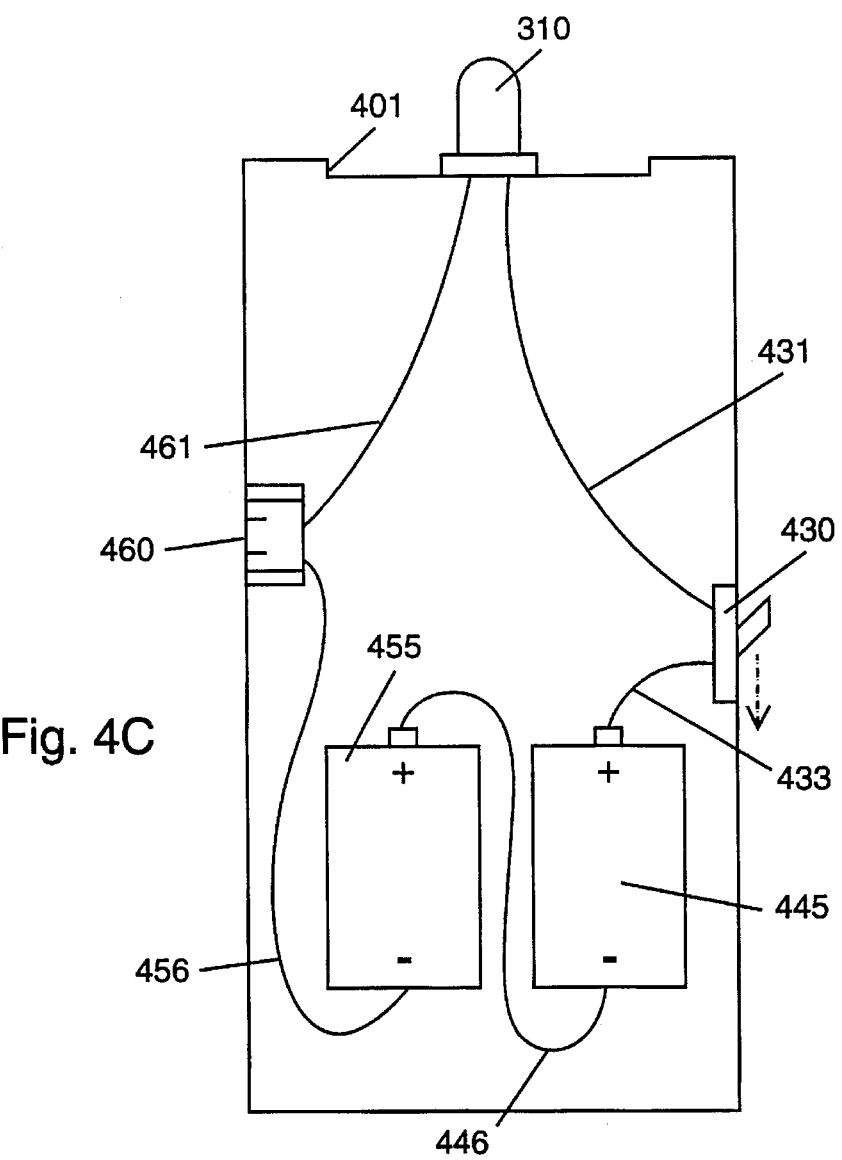
FIG. 4C is a schematic perspective view of the electronic circuitry contained within the casing of the omni-directional LED lamp device of FIGS. 4A-4B.

FIG. 4C is a schematic perspective view of the electronic circuitry contained within the casing 400 of the omni-directional LED lamp device of FIGS. 4A–4B. Referring to FIGS. 4A4C, lens 350 is mounted onto the top of casing 410 in a groove area 401 that can snapably fit rim 355 of lens 350. Alternatively, indented area 401 can have threads to be mateable to threads on rim 355. Casing 410 can be formed from plastic, aluminum, galvanized steel and the like and can include gasket materials(not shown) in order to waterproof the inside. Inside casing 410, (shown in FIG. 4C, the LED light source is electrically connected by conductor 431 to a switch 430, toggle switch, push-button, and the like. Switch 430 is then connected by conductor 433 to batteries 445 and 455, such as but not limited to two alkaline "D" cells. Batteries 445,446 can optionally be connected to an outside adapter plug outlet 460 which can be used to recharge the batteries and/or run power to the device from an external power supply such as an electrical outlet and the like. Conductor 461 connects to LED 310 to complete the circuit.

Optionally, switch 430 can be a photo-cell that enables the device 400 to be automatically activated at dusk.

Figure 4D:
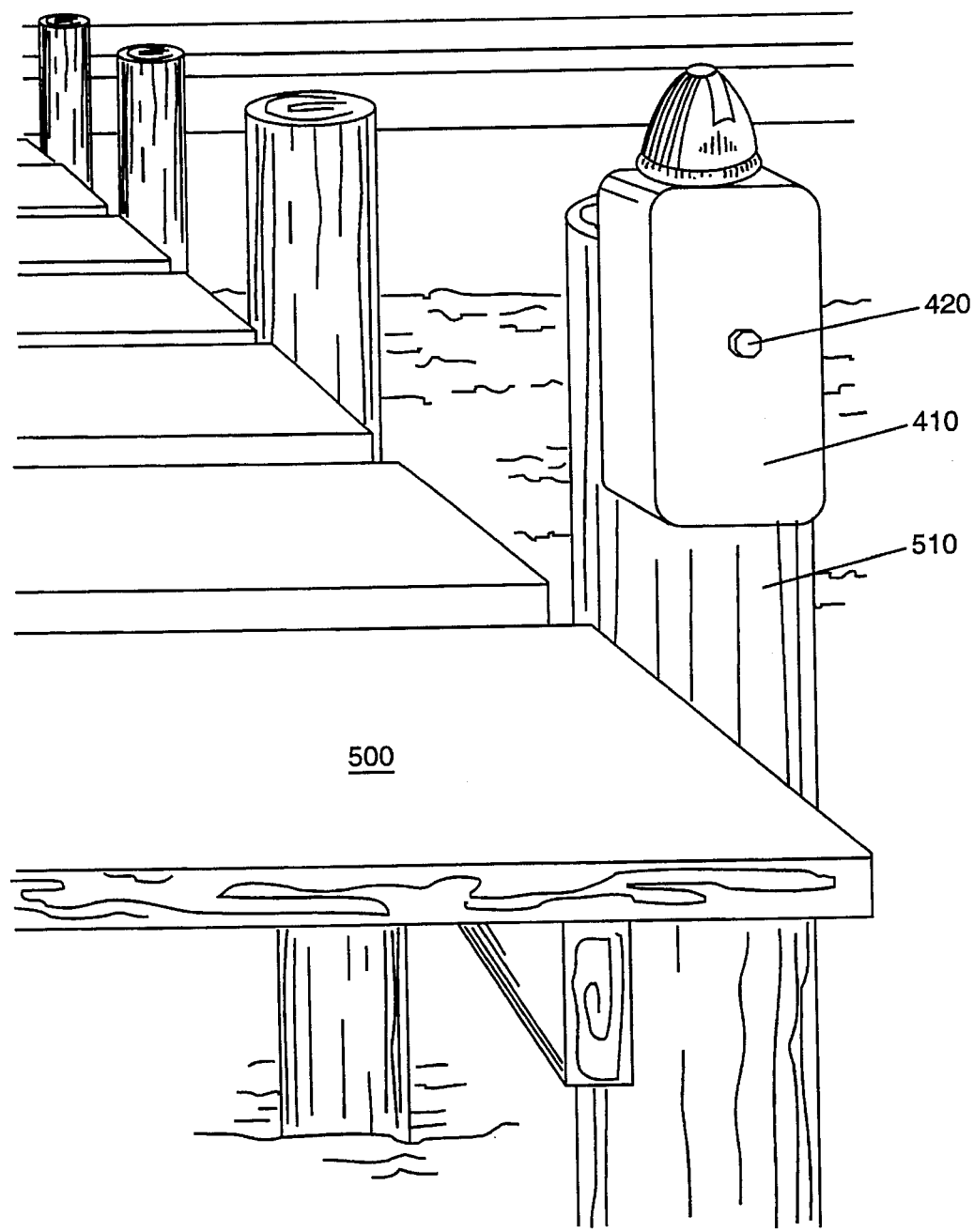
FIG. 4D is a perspective view of the novel omni-directional LED lamp device of FIGS. 4A-4C applied to a dock for marine applications.

FIG. 4D is a perspective view of the novel omni-directional LED lamp device of FIGS. 4A–4C applied to a dock for marine applications 500, where casing 410 can be attached to a piling of a dock 500 by threaded bolt 420.

The operation of embodiment 400 will now be discussed in reference to FIGS. 4A–4D. Turning on switch 430 applies electrical power to LED 3 10. In operation, LED 310 with reflector 315 has a measured brightness of approximately 2 candela and a flash rate of approximately 25 flashes per minute in a flashing mode. LED 3 10 emits a cone shaped light pattern that is reflected by spherical reflector 315 so that the light is emitted 360° along the direction of arrows M1–M2.

Although, the embodiment 300 of FIGS. 4A–4D has been described using an LED light source, this embodiment can alternatively be used with a incandescent light bulb such as but not limited to an incandescent light bulb.

While the embodiment 300 of FIGS. 4A–4D describe the lens 350 with reflector 315 on top of box 400, the lens can alternatively be used on different mounts where 360° viewing is needed.

Optionally the LED 310 and/or the lens cover 350 of FIGS. 4A–4C can include a phosphorescent coating which glows when the LED 310 is on so as to diffuse the light evenly over a wide viewing angle and amplify visibility.

The LEDs' of the above embodiments can optionally include a phosphorescent coating which glows when the LEDs' are one so as to diffuse the light evenly over a wide viewing angle and amplify visibility.

The embodiments described above can be used with vehicles such as but not limited to aircraft, boats, trailers, and the like.

Although the embodiments describe the LEDs as connected in series, the LEDs can alternatively be connected in parallel or operated individually.

Although only two LEDs are described, the invention covers connecting plural LEDs(i.e. three or more) together. Furthermore, any two or more LEDs can be supported by a single clear plastic tubular canopy.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An omni-directional LED lamp useful for traffic control and warning devices that reflects light in a 360 degree circumferential direction without having to rotate any components, comprising:

a first LED;

a first semi-spherical reflector having a continuous convex reflective surface, the first semi-spherical reflector mounted above the first LED, wherein light from the first LED is reflected substantially in a 360 degree circumference rendering the first LED omni-directional; and a first clear plastic tubular holder for tightly holding the first semi-spherical reflector oriented directly above the first LED in a stationary non rotating position, wherein the first semi-spherical reflector reflects light in a 360 degree circumferential direction.

2. The omni-directional LED lamp of claim 1, further comprising:

a second LED positioned side-by-side to the first LED, the second LED electrically connected in series to the first LED;

a second semi-spherical reflector having a continuous convex reflective surface, the second semi-spherical reflector mounted above the second LED, wherein light from the second LED is reflected substantially in a 360 degree circumference rendering the second LED omni-directional; and a second clear plastic tubular holder sized for tightly holding the second semi-spherical reflector oriented directly above the first LED in a stationary non rotating position, the second semi-spherical reflector reflects light of the second LED in a 360 degree circumferential direction, wherein the first clear plastic tubular holder and the second clear plastic tubular holder are side by side to one another.

3. The omni-directional LED lamp of claim 2, further comprising:

a miniature bayonet base; and prongs on opposite sides of the bayonet base; and a miniature bayonet socket, wherein the base and prongs are sized to fit both the first LED and the second LED lamp into the miniature bayonet socket.

4. The omni-directional LED lamp of claim 1, wherein the first semi-spherical reflector includes:

a mirror finish deposited on a plastic shape.

5. The omni-directional LED lamp of claim 1, wherein the first semi-spherical reflector includes:

a semi-spherical metal ball bearing.

6. The omni-directional LED lamp of claim 1, further comprising:

a miniature bayonet base attached to a lower surface of the first LED beneath the first clear plastic tubular holder; and prongs on opposite sides of the bayonet base; and a miniature bayonet socket, wherein the base and prongs are sized to fit the lamp into the miniature bayonet socket.

7. An omni-directional LED lamp useful for traffic control and warning devices that reflects light in a 360 degree circumferential direction without having to rotate any components, comprising:

a first LED;

a single spherical reflector having a continuous spherical convex reflective surface, the single spherical reflector mounted above the first LED, wherein light from the first LED is reflected substantially in a 360 degree circumference rendering the first LED omni-directional;

a second LED oriented in a direction opposite and facing the first LED with the spherical reflector positioned between the first LED and the second LED, the second LED electrically connected in series to the first LED, wherein light from the second LED is reflected by the spherical reflector substantially in a 360 degree circumference rendering the second LED omni-directional; and a single clear plastic tubular holder sized for tightly holding the first LED, the spherical reflector, and the second LED in a vertical row and in stationary non rotating positions to one another; and a single mount support attached beneath the second tubular LED for supplying power to both the first LED and the second LED.

8. The omni-directional LED lamp of claim 7, wherein the spherical reflector includes:

a mirror finish deposited on a plastic shape.

9. The omni-directional LED lamp of claim 7, wherein the spherical reflector includes:

a semi-spherical metal ball bearing.

10. The omni-directional LED lamp of claim 7, the single mount support including:

a single miniature bayonet base attached to a lower end of the first LED beneath the clear plastic tubular holder; and prongs on opposite sides of the bayonet base; and a single miniature bayonet socket, the base and prongs sized to fit the lamp into the miniature bayonet socket.

11. An omni-directional warning light that reflects light in a 360 degree circumferential direction without having to rotate any components, comprising:

an LED light source;

a dome shaped colored lens cover covering the LED light source, the lens cover having a color chosen from one of yellow, orange and red; and a semi-spherical reflector having a continuous convex reflective mirror finish surface mounted inside the lens cover located above and facing the LED light source, wherein emitted light from the LED light source is reflected substantially in a 360 degree circumference rendering the light source omni-directional.

12. The omni-directional warning light source of claim 11, further comprising:

a casing for mounting to a base of the LED light source; and batteries within the casing and electrically connected to the LED for powering the LED light source.

13. The omni-directional warning light source of claim 11, further comprising:

a photo-cell switch for activating the LED light source.

14. The omni-directional warning light source of claim 11, further comprising:

a bolt screw for mounting the casing to an external support.

* * * * *